(12) United States Patent
Braford, Jr.

(10) Patent No.: US 7,497,312 B2
(45) Date of Patent: Mar. 3, 2009

(54) CLUTCH ASSEMBLY

(75) Inventor: Thomas E. Braford, Jr., Brighton, MI (US)

(73) Assignee: BorgWarner Inc., Auburn Hills, MI (US)

( * ) Notice: Subject to any disclaimer, the term of this patent is extended or adjusted under 35 U.S.C. 154(b) by 321 days.

(21) Appl. No.: 11/411,306

(22) Filed: Apr. 26, 2006

(65) Prior Publication Data

US 2007/0034476 A1 Feb. 15, 2007

Related U.S. Application Data

(60) Provisional application No. 60/707,058, filed on Aug. 10, 2005.

(51) Int. Cl.
*F16D 25/10* (2006.01)
*F16D 25/08* (2006.01)

(52) U.S. Cl. ............... 192/87.11; 192/85 CA; 192/110 B

(58) Field of Classification Search .......... 192/87.1, 192/87.11, 87.14, 87.15
See application file for complete search history.

(56) References Cited

U.S. PATENT DOCUMENTS

| | | | |
|---|---|---|---|
| 5,109,964 A | 5/1992 | Fukui et al. | |
| 5,405,293 A | 4/1995 | Severinsson | |
| 6,360,863 B1 | 3/2002 | Young | |
| 6,374,976 B1 | 4/2002 | Alberni et al. | |
| 6,375,442 B1 | 4/2002 | Ward et al. | |
| 6,454,074 B1 * | 9/2002 | Kundermann et al. | 192/87.11 |
| 7,287,634 B2 * | 10/2007 | Agner et al. | 192/87.11 |
| 2002/0060118 A1 | 5/2002 | Beneton et al. | |
| 2004/0206599 A1 * | 10/2004 | Hegerath | 192/87.11 |
| 2005/0049106 A1 | 3/2005 | Stevenson et al. | |
| 2005/0067251 A1 * | 3/2005 | Braford et al. | 192/70.12 |

* cited by examiner

*Primary Examiner*—Richard M. Lorence
*Assistant Examiner*—John V Ligerakis
(74) *Attorney, Agent, or Firm*—Warn Partners, P.C.

(57) ABSTRACT

A clutch assembly for use in a transmission of a motor vehicle is provided including, a stationary frame, a non-rotating apply piston mounted with the frame, a clutch hub torsionally connected with a portion of a friction pack, a clutch housing torsionally connected with another portion of a friction pack, the housing having a stop for the friction pack, an apply bearing with a first race operatively associated with an apply member and a second race operatively associated with the piston, and a reaction bearing with an outer race operatively associated with the frame and an inner race associated with the clutch housing.

24 Claims, 3 Drawing Sheets

CLUTCH ASSEMBLY

CROSS-REFERENCE TO RELATED APPLICATIONS

This application claims the benefit of U.S. Provisional Application No. 60/707,058 filed Aug. 10, 2005. The disclosure of which is incorporated herein by reference.

FIELD OF THE INVENTION

The present invention relates to clutches, especially clutch assemblies used in automotive manual transmissions. The present invention is additionally useful in dual clutch automatic transmissions (DCT) such as shown in U.S. Pat. No. 6,012,561, Reed Jr. et al., the disclosure of which is incorporated by reference herein.

BACKGROUND OF THE INVENTION

Electromechanical automatic transmission which utilizes the manual-type transmission design in order to eliminate the parasitic losses associated with the torque converter and the hydraulic controls of conventional automatic transmissions have been developed. Such electromechanical automatic transmissions are essentially an automated manual transmission that utilizes a dual clutch/dual input shaft layout. The layout is the equivalent of having two transmissions in one housing. Each transmission can be shifted and clutched independently. Uninterrupted power upshifting and downshifting between gears is available along with the high mechanical efficiency of a manual transmission being available in an automatic transmission. Significant increases in fuel economy and vehicle performance are achieved.

Both manual and electromechanical automatic transmission which utilizes the manual-type transmission design require a clutch assembly.

SUMMARY OF THE INVENTION

The present invention provides a clutch assembly for manual and automatic transmissions which utilizes the manual-type transmission clutch design that is an alternative to those revealed prior.

Other features of the invention will become more apparent to those skilled in the art as the invention is further revealed in the accompanying drawings and Detailed Description of the Invention.

DETAILED DESCRIPTION OF THE INVENTION

Figure 1:
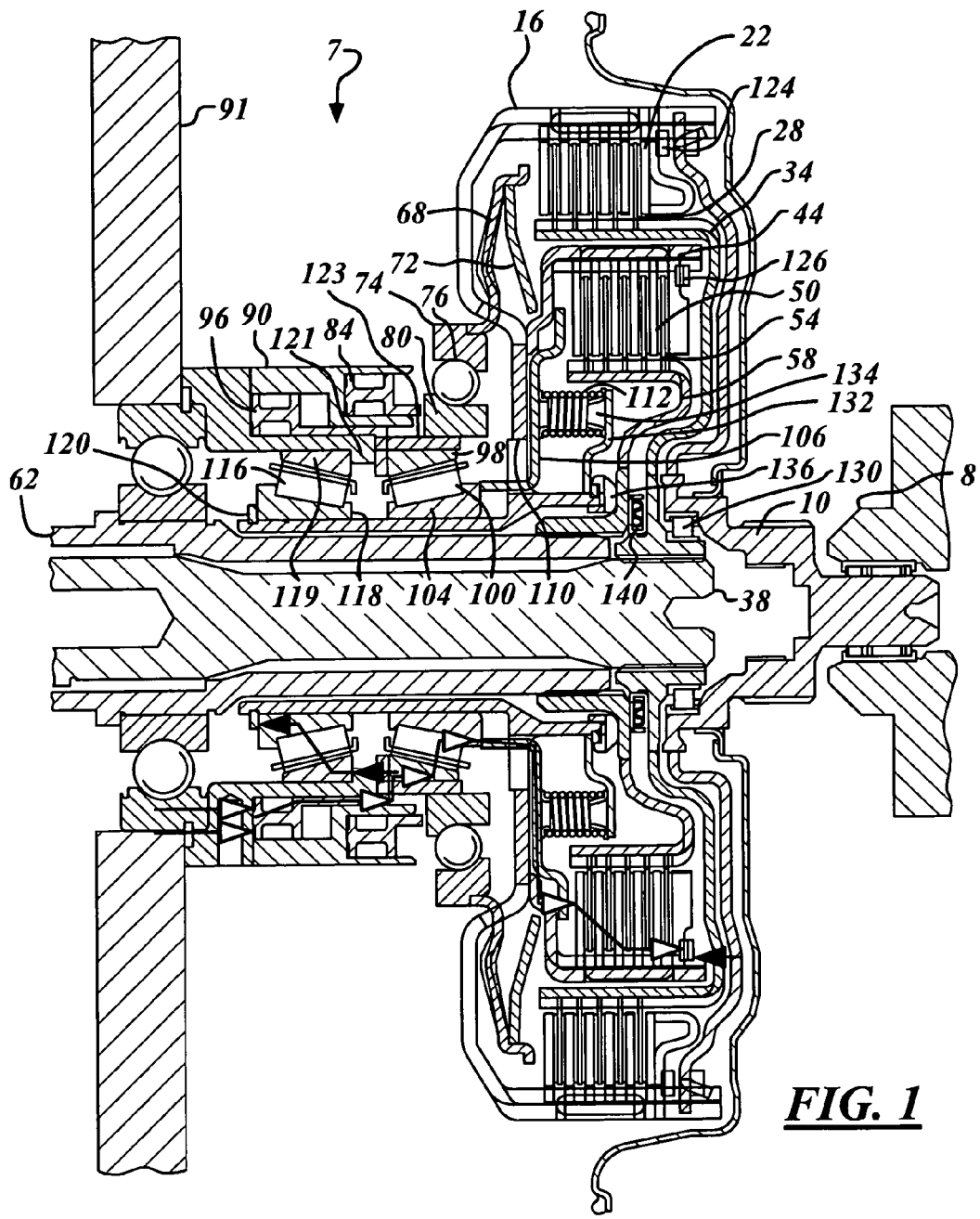
FIG. 1 is a sectional view of a clutch assembly of the present invention additionally illustrating the load path for the outer clutch.

Referring to FIG. 1 a fluid pressurized clutch assembly 7 for use in transmission of a motor vehicle is provided. The clutch assembly 7 includes a transmission input hub 10. An engine crankshaft 8 via a torsional damper (not shown) rotates the hub 10. The crankshaft 8 on one end radially supports the input hub 10. The input hub 10 is radially engaged by a bearing 130 associated with an inner clutch hub 34 at the input hub's 10 opposite end.

The input hub 10 is torsionally connected with a clutch housing 16. Splined for torsional connection to the clutch housing 16 is a second portion of a clutch or friction pack provided by a series of pressure plates 22. Separating the pressure plates 22 is a first portion of the friction pack provided by a series of friction plates 28. The friction plates 28 are splined for torsional connection to the inner clutch hub 34. The inner clutch hub 34 is splined to a torsion transfer member provided by an inner input shaft 38 of a dual clutch transmission.

The clutch housing 16 has an annular arm 44 that is splined to a portion of a second clutch or friction pack provided by a series of pressure plates 50. The pressure plates 50 are separated by another portion of the friction pack provided by series of friction plates 54. The friction plates 54 are splined to an outer clutch hub 58. The outer clutch hub 58 that is splined to an outer input shaft 62. The outer clutch hub 58 is axially separated from the inner clutch hub 34 by a thrust bearing 140. The outer clutch hub 58 is axially separated from the clutch housing 16 by a clutch hub 34 by a thrust washer 136.

An inner clutch apply member provided by a plate 68 is biased to non-applied position by a plate spring 72. The lower end of the inner clutch apply plate 68 is operatively associated with a first or outer race 74 of a ball apply bearing 76. A second or inner race 80 of the apply bearing is operatively associated with an annular hydraulic actuated piston 84.

The piston 84 is non-rotatably slideably mounted in a stationary frame 90. The frame 90 is fixed with a transmission housing 91. The frame 90 also non-rotatably slideably mounts a piston 96. The piston 96 has a rod extension 123. The piston 96 can be activated to axially engage, via the extension 123, a second or outer race 98 of a tapered roller second apply thrust bearing 100 in a direction toward the input hub 10. The second apply bearing 100 is slidable upon an outer diameter of a tubular portion of the clutch housing 16.

A first or inner race 104 of the second apply bearing 100 is operatively associated for engagement with a fingered apply ring or plate 106. Portions of the apply plate 106 extend through an opening 110 in the clutch housing 16. The apply plate 106 is biased to a non-applied position by a series of coil springs 112. The springs 112 are aligned by spring mounts 134. The spring mounts 134 are provided on a spring mount plate 132. The spring mount plate 132 is snap ring retained to the clutch housing 16.

Figure 3:
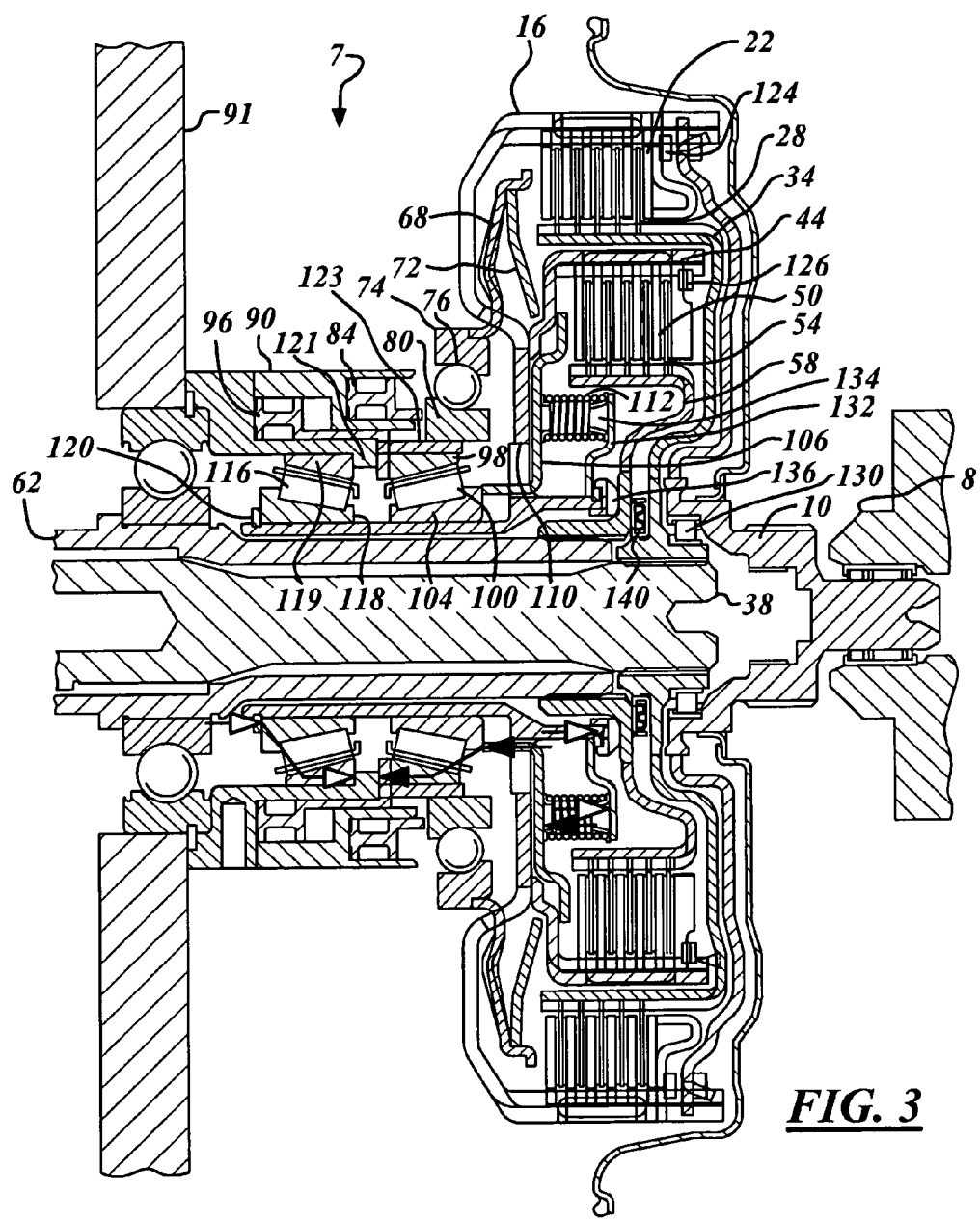
FIG. 3 is a sectional view of a clutch assembly of the present invention additionally illustrating the load path of a preload of a reaction bearing for the clutch assembly.

The springs 112 also pre-load the reaction bearing 116 and second apply bearing 100. The bearing 116 has an inner race 118 abutting a stop provided by a snap ring 120 on clutch housing 16. The springs 112 apply a force (FIG. 3) on the clutch housing 16 and this force is transmitted to the reaction bearing 116 and into a frame stop 121 via an outer race 119. In the other direction the springs 116 apply a force into the apply plate and this force is transmitted into the second apply bearing 100 and into the frame stop 121. The preloading of the bearings 100 and 116 aid in the radial support of the barrel portion of the clutch housing 16.

Figure 2:
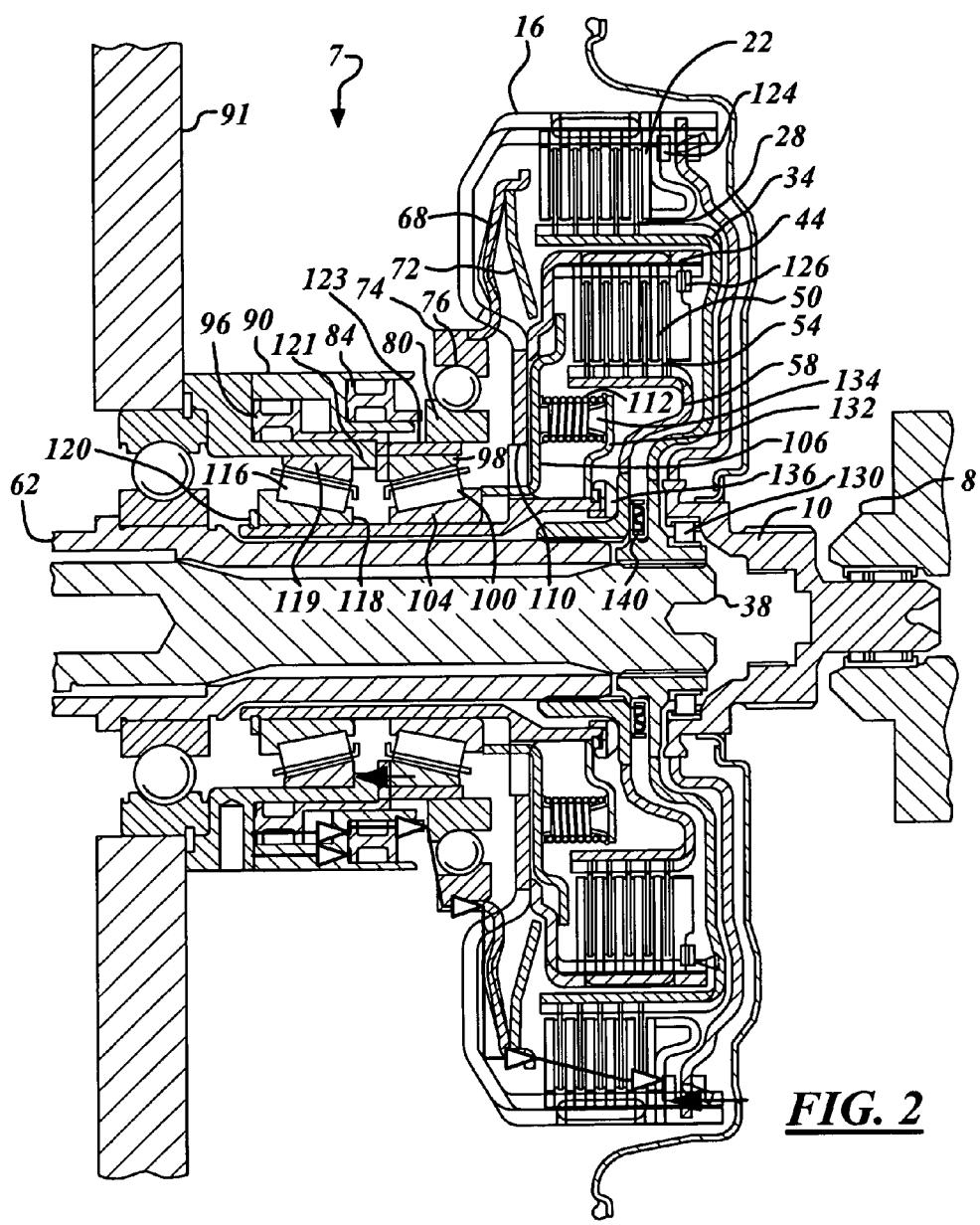
FIG. 2 is a sectional view of a clutch assembly of the present invention additionally illustrating the load path for the inner clutch.

Referring to FIG. 2 to activate the friction pack provided by the pressure plates 22 and friction plates 28, the load path is piston 84, inner race 80, outer race 74, pressure plates 22, and friction plates 28 against a snap ring stop 124. The above noted action torsionally joins input hub 10 with inner clutch hub 34 to rotate inner shaft 38. The reaction path for forces is axially along the clutch assembly 7 is stop 124, clutch housing 16, stop 120, reaction bearing 116, and frame stop 121.

Referring back to FIG. 1, to activate the outer clutch (for the shaft 62), the load path is piston 96, outer race 98, inner race 104, apply plate 106, pressure plates 50 and friction plates 54, and snap ring stop 126. The above action torsionally joins the outer clutch hub 58 with the input hub 10. Reaction force is from stop 126, annular arm 44, clutch housing 16, stop 120, reaction bearing 116 and frame stop 121. Therefore, both clutches utilize a common reaction bearing 116 to restrain axial movement of the clutch housing 16 in a direction toward the input hub 10.

Axial reaction forces into the input hub 10 are eliminated with activation or non-activation of the inner or outer clutches pistons 84, 96. Accordingly, activation of the inner or outer clutches of the clutch assembly 7 will not axially load an engine crank shaft 8 powering the clutch assembly 7 or the inner and outer input shafts 38 and 62. The inner bearing race 80 and the outer bearing race 98 isolate their respective pistons 84, 96 from contact with their respective apply members 68, 106 to allow the pistons to remain stationary (non-rotating) when activated.

The inner race 80 has relative sliding movement with respect to the outer race 98 allowing the inner and outer clutches to be operated independently without moving the other clutch piston.

While preferred embodiments of the present invention have been disclosed, it is to be understood it has been described by way of example only, and various modifications can be made without departing from the spirit and scope of the invention as it is encompassed in the following claims.

What is claimed is:

1. A clutch assembly for use in a transmission of a motor vehicle comprising:
   a stationary frame;
   a non-rotating apply piston mounted with said frame;
   a clutch hub torsionally connected with a first portion of a friction pack;
   a clutch housing torsionally connected with a second portion of said friction pack, said housing having a stop for said friction pack;
   an apply bearing with a first race operatively associated with an apply member and a second race operatively associated with said piston; and
   a reaction bearing loading substantially all reaction force into said frame with an outer radial race operatively associated with said frame and an inner race connected with said clutch housing.

2. A clutch assembly as described in claim 1 wherein said apply member is biased to a non-applied position.

3. A clutch assembly as described in claim 1 wherein said apply member is positionally biased by a coil spring.

4. A clutch assembly as described in claim 1 wherein said apply member is positionally biased by a plate spring.

5. A clutch assembly as described in claim 1 wherein said apply bearing is a ball bearing.

6. A clutch assembly as described in claim 1 wherein said apply bearing is a tapered roller bearing.

7. A clutch assembly as described in claim 1 wherein said reaction bearing is a tapered roller bearing.

8. A clutch assembly as described in claim 1 wherein said apply member is a fingered plate.

9. A clutch assembly as described in claim 1 wherein said apply member contacts an outer race of said apply bearing.

10. A clutch assembly as described in claim 1 wherein said apply member contacts an inner race of said apply bearing.

11. A clutch assembly as described in claim 1 wherein said apply member is non-contacting with said piston.

12. A clutch assembly as described in claim 1 wherein said apply member is positionally biased by a spring that preloads said reaction bearing.

13. A clutch assembly as described in claim 1 wherein said spring preloads said apply bearing to radially support said housing.

14. A clutch assembly as described in claim 1 further including a transmission input hub torsionally connected with said housing.

15. A clutch assembly as described in claim 14 wherein activation of said piston does not load said transmission input hub.

16. A clutch assembly as described in claim 14 wherein non-activation of said piston does not load said transmission input hub.

17. A clutch assembly as described in claim 1 said apply bearing has a race sliding upon said housing.

18. A clutch assembly as described in claim 1 further including a second non-rotating piston mounted with said frame, a second friction pack with a portion torsionally connected with another hub and another portion torsionally connected with said housing and wherein said housing has a second stop, and a second apply bearing with a first race operatively associated with a second apply member and a second race operatively associated with said second piston.

19. A clutch assembly as described in claim 18 wherein both of said apply members are biased to a non-applied position.

20. A clutch assembly as described in claim 18 having a common reaction bearing.

21. A clutch assembly as described in claim 18 wherein said inner race of one apply bearing has sliding relative moment with an outer race of said other apply bearing.

22. A clutch assembly as described in claim 18 wherein both of said pistons can be applied independently without moving said other piston.

23. A hydraulic clutch assembly for use in a transmission of a motor vehicle, comprising:
   a first clutch operatively associated with a first apply plate;
   a first bearing having inner and outer races, said first bearing outer race being operatively associated with said first apply plate;
   a first non-rotating apply piston operatively associated with said first bearing inner race;
   a second clutch operatively associated with a second apply plate;
   a second bearing having inner and outer races, said second bearing inner race being operatively associated with said second apply plate;
   a second non-rotating apply piston operatively associated with said second bearing outer race;
   a first load path comprised of pressure applied from said first piston to said first bearing inner race, to said first bearing outer race, to said first apply plate and to said first clutch;
   a second load path comprised of pressure applied from said second piston to, to said second bearing outer race, to said second bearing inner race, to said second apply plate and to said second clutch;
   wherein when said first non-rotating piston and said second non-rotating piston are applied, said first bearing allows said first piston to remain non-rotational, and said second bearing allows said second piston to remain non-rotational; and a reaction bearing loading substantially all reaction force into said transmission frame with an outer radial race operatively associated with said frame and an inner radial race connected with said clutch housing.

24. A method of torsionally clutching an input member with a torsion transfer member of a vehicle transmission comprising:

torsionally connecting said input member with a clutch housing having a stop;

torsionally connecting with said clutch housing a second portion of a clutch friction pack;

torsionally connecting with a first portion of a clutch friction pack a hub torsionally connected with said torsion transfer member;

engaging said portions of said clutch together with an apply member, said apply member being engaged by one of a first and second race of an apply bearing;

axially engaging another of said first and second race of said apply bearing with a non-rotating piston mounted in a frame, said piston moving in a direction toward said input member; and axially restraining movement of said clutch housing in a direction toward said input member with a thrust bearing having a radial outer race abutting a stop on said frame and a radial inner race connected with said clutch housing.

\* \* \* \* \*